R. A. WILSON.
HUMIDOR.
APPLICATION FILED FEB. 24, 1911.
1,035,507.
Patented Aug. 13, 1912.
4 SHEETS—SHEET 1.
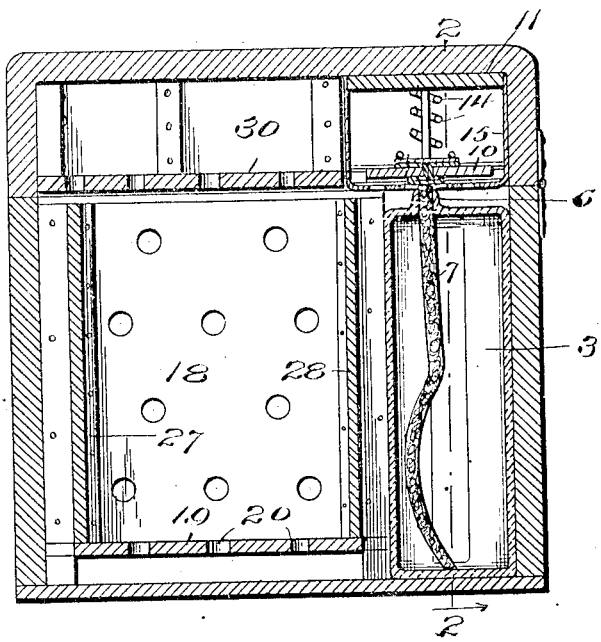
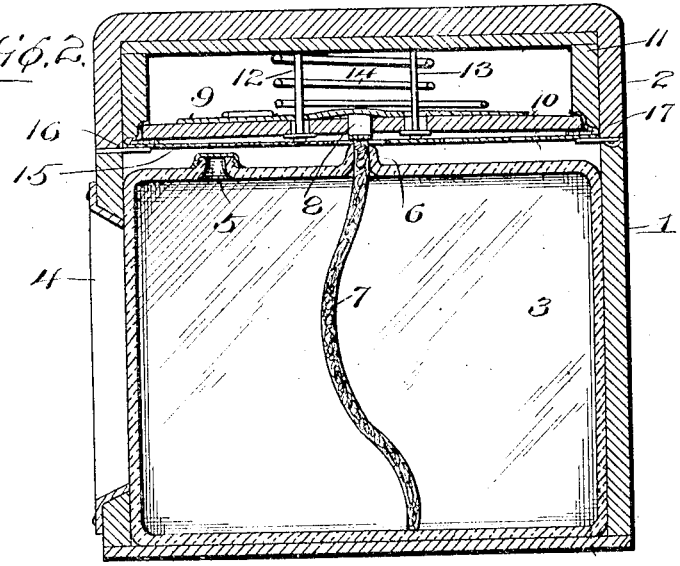

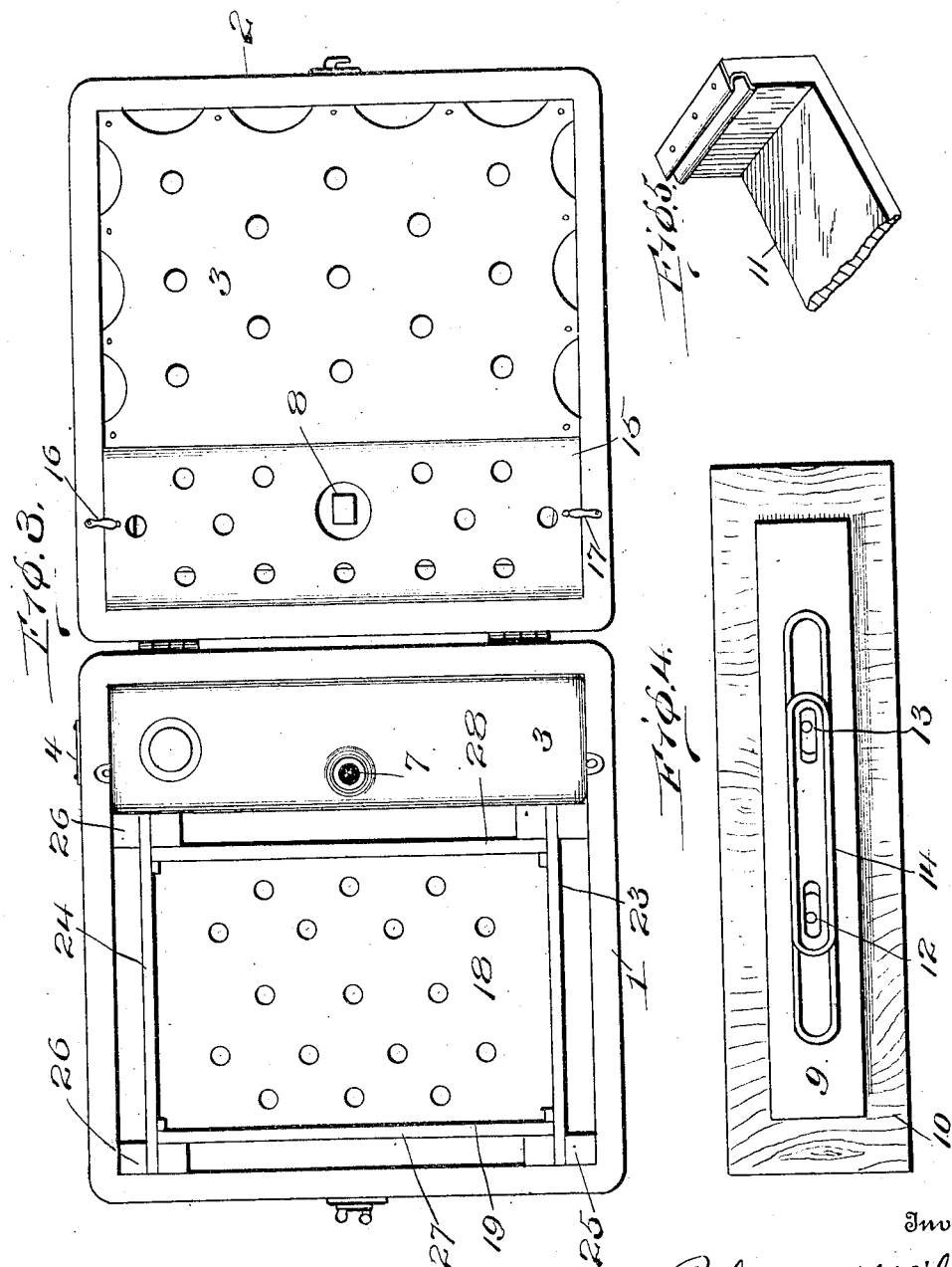

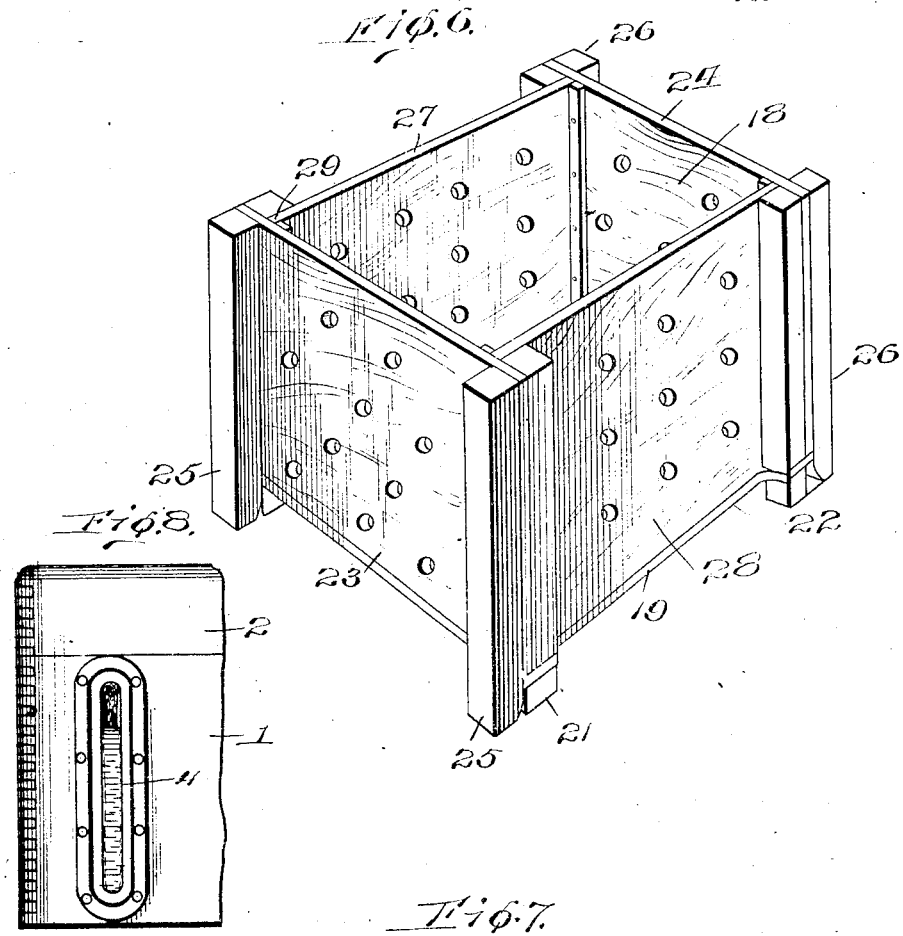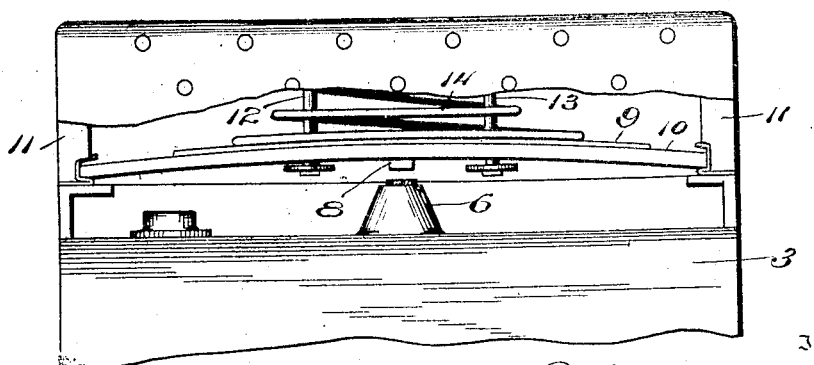

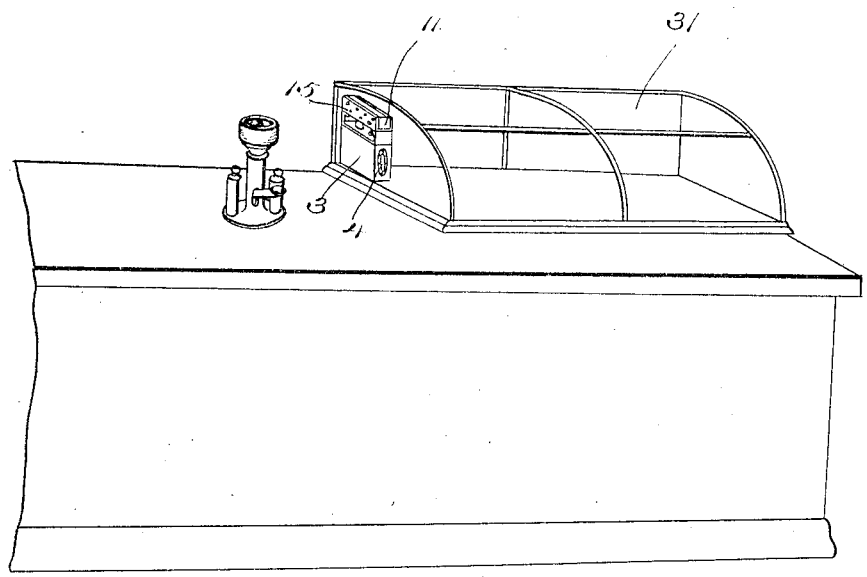
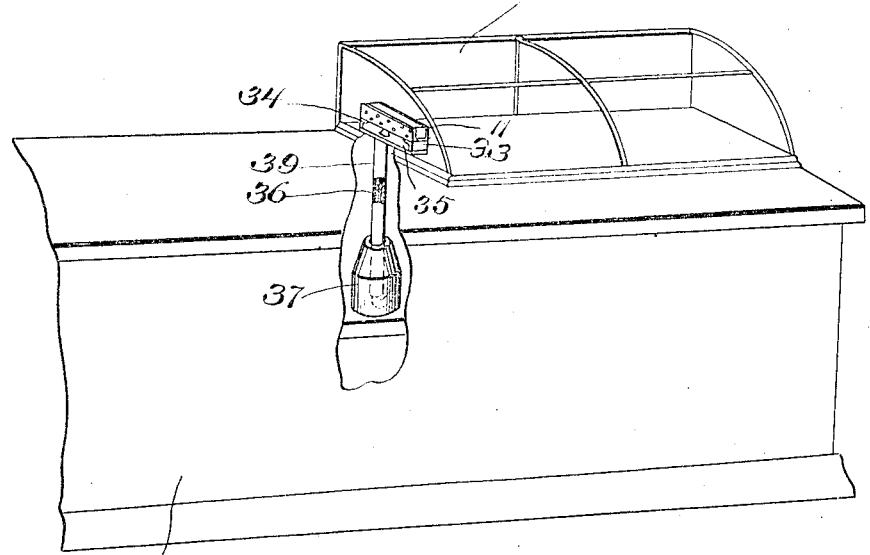

UNITED STATES PATENT OFFICE.

ROLAND A. WILSON, OF TAMPA, FLORIDA.

HUMIDOR.

1,035,507.

Specification of Letters Patent. Patented Aug. 13, 1912.

Application filed February 24, 1911. Serial No. 610,537.

*To all whom it may concern:*

Be it known that I, ROLAND A. WILSON, a citizen of the United States, residing at Tampa, in the county of Hillsboro and State of Florida, have invented certain new and useful Improvements in Humidors; and I do hereby declare the following to be a full, clear, and exact description of the invention, such as will enable others skilled in the art to which it appertains to make and use the same.

This invention relates to improvements in humidors, and has for an object improved means for maintaining a moist atmosphere within a receptacle or housing.

A further object of the invention is to provide means whereby moisture in the form of a body of liquid can be maintained in a predetermined position in a receptacle, and with improved means for conveying the liquid from said predetermined position to a distributing means within the receptacle for maintaining a proper moisture in the entire receptacle.

Another object of the invention is to provide improved means whereby the liquid retaining receptacle is entirely separated from the main receptacle, and may be removed therefrom to a considerable distance if desired without injuring the efficiency of the device.

A still further object of the invention is the arrangement of improved means for distributing moisture, associated with auxiliary distributing means automatically operated by the moisture for turning on and off the moisture to the distributing means.

With these and other objects in view the invention comprises certain novel constructions, combinations, and arrangement of parts as will be hereinafter more fully described and claimed.

In the accompanying drawings: Figure 1 is a longitudinal vertical section through an embodiment of the invention. Fig. 2 is a section through Fig. 1 approximately on line 2—2. Fig. 3 is a top plan view of the device shown in Fig. 1 with the lid shown open. Fig. 4 is a top plan view of an automatic moisture connecting and disconnecting member, the same being shown associated with the moisture distributing member and retaining member therefor. Fig. 5 is an inverted detail fragmentary view of one end of a retaining member for the automatic moisture connecting and disconnecting member. Fig. 6 is a perspective view of an article receiving housing embodying certain features of the invention. Fig. 7 is a fragmentary side view of the moisture distributing device, the same being shown disconnected from its supply. Fig. 8 is a fragmentary side view of the structure shown in Fig. 1, the same being shown on a reduced scale and disclosing a water gate. Fig. 9 is a perspective view of the moisture distributing means applied to a show case. Fig. 10 is a view similar to Fig. 9, but disclosing a slightly modified form of the invention.

In constructing a device embodying the invention the same may be slightly varied without changing the principle involved so as to be arranged in a housing for accommodating, for instance, a few cigars or other articles, but may be arranged to be used in connection with a show case or other receptacle. When constructing a device for containing, for instance a few cigars, an auxiliary receptacle is provided formed of any desired material, preferably Spanish cedar, the same being arranged in the same housing as the moisture distributing means. The moisture distributing means is formed with a receptacle for containing liquid. The liquid containing receptacle is provided with a wick extending to the exterior thereof, and arranged to transmit by capillary attraction moisture to a point of contact with a moisture distributing pad or member arranged on an automatically movable device formed preferably of wood, which when wet will expand and cause the disconnection of the moisture distributing member with the wick. By this structure the distribution of moisture is regulated or maintained at a certain degree of distribution as the wick will be disconnected from the distributing member whenever there is too much moisture in the said distributing member, but will be again connected automatically when sufficient evaporation has taken place to permit said distribution member to again make contact with the wick. A spring is provided for normally resisting the disconnection of the wick, and for causing the positive connection thereof when moisture is needed. By this construction and arrangement of means for distributing moisture the atmosphere in any receptacle may be maintained for properly preserving articles requiring moisture, as for instance, articles made from tobacco, or tobacco in any of its various conditions.

In order that the invention may be more clearly understood an embodiment of the same is shown in the accompanying drawings in which—

1 indicates a housing of any desired kind having a lid 2. In housing 1 is arranged a receptacle 3 formed of any desired material which will hold water without injury, the same being made preferably of glass in order to permit the gage or opening 4 to indicate the height of the liquid in the receptacle without necessitating the opening of the receptacle. The receptacle 3 is provided with a filling opening 5 normally closed by a suitable cap, and is also provided with an opening 6 through which passes wick 7. Wick 7 is arranged to extend to the bottom of the receptacle 3, and to a short distance above opening 6, so as to readily contact with the auxiliary wick member 8 which extends up to and engages a moisture distributing pad 9, formed preferably of blotting paper, though other absorbent material may be used within the spirit of the invention as anything which will receive moisture from auxiliary wick 8 by capillary attraction and distribute moisture is all that is needed. The pad 9 may be made any desired size, and is arranged to substantially cover the automatic disconnecting member 10 which is preferably formed of wood, and also preferably formed of what is known as Spanish cedar. The grain of the wood of member 10 extends transversely so that the movement of member 10 by expansion and contraction will be longitudinal. By this arrangement whenever moisture is supplied to pad 9 the same will supply member 10 with moisture, and as member 10 is moistened the same will automatically expand longitudinally. As the ends of member 10 are held rigidly against movement the only other recourse is for the member to bow centrally and stay bolts 12 and 13 prevent the movement of the member 10 in one direction, so that the member can only move in one direction, namely away from the end of wick 7. In order that no expansion will take place unless a predetermined amount of water is in the air, and consequently a predetermined amount of moisture in member 10, a spring 14 is provided which normally presses against pad 9, which transmits pressure to member 10, one end of the spring 14 being enlarged for holding pad 9 in place, and the other end being arranged to engage the framework 11. If desired a washer and nuts could be provided for the stay members 12 and 13 between framework 11 and the end of spring 14, so as to provide means for adjusting the tension thereof, and consequently for varying the action of member 10 within certain limits, though ordinarily spring 14 is made for permitting a proper expansion of member 10 when the same is thoroughly saturated, which saturation will not take place until a proper amount of moisture has been provided for the surrounding air. A metallic sheathing 15 is provided which extends between receptacle 3 and framework 11 and surrounding parts, and also extends up along the sides of framework 11, the same being perforated on the bottom and sides for permitting a free circulation of air and moisture, a suitable aperture being provided for permitting the meeting of wicks 7 and 8. When housing 1 is used, together with framework 11, pivotally mounted retaining members 16 and 17 are provided for supporting framework 11 and associated parts properly in the lid 2.

Arranged in housing 1 adjacent receptacle 3 is an article receiving receptacle 18 (Figs. 1 and 6). This receptacle is formed preferably of five independent parts, namely a bottom, end members, and side members, the end members and side members slidingly fitting together and formed so that the end portions will fit over the bottom. The bottom 19 is formed with a plurality of apertures 20, and preferably a leg or foot 21 at each corner, the bottom being cut out at each side at point 22 for forming a space between the same and the side of housing 1. The legs 21 are arranged so as to fall short of the ends of the housing 1, but are designed to come in contact with the sides of the housing for properly holding the bottom in position. The end members 23 and 24 are provided with corner posts 25 and 26 respectively which extend below the end members so that the bottom of the posts will engage the bottom of housing 1 at the same time that the end members will engage the top surface of bottom 19. By this arrangement the bottom portion will be prevented any longitudinal movement, and as the legs 21 engage the sides of the housing 1 no transverse movement can be had. The side members 27 and 28 are arranged to slide between suitable ways 29 formed at each end of each of the end members. Both side members and both end members are provided with suitable perforations as well as the bottom, so that a free circulation of air and moisture may be had. As shown more particularly in Figs. 1 and 3 the moisture may pass from pad 9 over to the article receiving receptacle 18 down into the same and around the same as the side and end walls and the bottom thereof are spaced from receptacle 1 and associated structures. A perforated covering member 30 is provided for receptacle 18, but is rigidly secured to the lid 2 of housing 1 and is raised from receptacle 18 whenever lid 2 is raised. In constructing the side and end members of receptacle 18 the same are preferably formed of cedar with the grain running longitudinally of each of the members so that any expansion and contraction thereof will be transversely of the respective members or toward the top and bottom of receptacle 1 where ample space is provided for taking care of such expansion and contraction. By arranging the grain of the wood in this manner the receptacle 18 will not swell and in any way injure housing 8 or unduly press against receptacle 3.

In Fig. 9 will be seen an arrangement of the receptacle 3 and framework 11 and associated parts designed to distribute moisture to a show case 31 instead of to the article receiving receptacle shown specifically in Fig. 6. The action of the moisture distributing means in connection with the show case 31 is similar to the action of the device when used in connection with housing 1 and receptacle 18, and will therefore need no additional description.

In Fig. 10 will be seen a slightly modified form of the invention in which the same principle involved for the distribution of moisture to a receptacle is used. In this form of the invention the receptacle, which is designed to receive the moisture, is shown as a show case 32 in which is provided the framework 11 and surrounding parts, including the moisture distributing pad 9, automatically disconnecting member 10, and associated parts, clearly disclosed in Figs. 1 and 2. These parts are supported by suitable brackets 33 and 34 to which is connected a plate 35 which is designed to take the place of the upper surface of receptacle 3. Passing through plate 35 is a wick 36 designed to receive moisture from a liquid containing receptacle 37 arranged beneath counter 38. Surrounding wick 36 is a tube 39 designed to extend from plate 35 to receptacle 37 and preferably a short distance into receptacle 37, or if desired entirely to the bottom thereof. Tube 39, of course, does not extend to the end of wick 36, but is designed to protect wick 36 against the same coming in contact with the atmosphere until the wick passes through plate 35 and engages or is in position to engage auxiliary wick 8. By the arrangement of the tube 39 in this manner a comparatively large receptacle 37 may be provided under the counter or at some considerable distance from framework 11, pad 9, and associated parts, without preventing proper capillary attraction, and proper distribution of moisture to pad 9.

What I claim is:

1. In a humidor, a liquid receptacle, a goods receptacle, an evaporation sheet disposed within the goods receptacle, a capillary member in engagement with the evaporation sheet and extending into the liquid receptacle and means for automatically disconnecting the capillary member from said evaporation sheet when the moisture in the atmosphere in the goods receptacle has attained a certain degree.

2. In a humidor, a housing, a liquid receiving receptacle, a wick arranged therein and extending therefrom, a moisture distributing member arranged in contact with said wick, and means for automatically disconnecting the wick from said moisture distributing member when the atmosphere in the housing has received a certain amount of moisture.

3. In a humidor, a housing, an article receptacle arranged therein formed with members spacing the sides of the members from the housing, a liquid containing receptacle, means for distributing moisture from said liquid containing receptacle to the air of said article receiving member and means for automatically disconnecting said moisture distributing means from said liquid containing receptacle when the atmosphere in said housing has received a certain amount of moisture.

4. In a humidor, a water containing tank, a wick positioned therein and having one end projecting therefrom, a moisture distributing member formed with a contact point designed to contact with the end of said wick and hygroscopic means moistened by said moisture distributing member for automatically moving said contact away from said wick when the moisture distributing member contains a predetermined amount of moisture.

5. In a humidor, a water containing receptacle, a wick arranged therein and projecting therefrom, a contact member arranged to contact with the part of the wick projecting from said receptacle for receiving moisture from the wick, a moisture distributing member contacting with said contact member and means bendable under the action of moisture contacting with said moisture distributing member for automatically moving the contact member out of contact with said wick when the moisture distributing member contains a predetermined amount of moisture.

6. In a humidor, a water receptacle, a wick arranged in said receptacle and projecting therefrom, a contact member arranged to contact with said wick for receiving water therefrom by capillary attraction, a distributing pad associated with said contact member, an automatically bowing hygroscopic member in contact with said pad and arranged to receive moisture therefrom for automatically moving said contact out of engagement with said wick when the pad and automatically bowing member contains a predetermined amount of moisture and means for positively moving said bowing member, pad and contact back to their original position for causing said contact member to contact with said wick when the moisture in said pad and said bowing member has been reduced to a predetermined amount.

7. In a humidor, a liquid containing receptacle, a wick arranged in said liquid containing receptacle and extending therefrom, a liquid distributing member arranged to contact with said wick for receiving liquid by capillary attraction therefrom and means automatically operated by the amount of liquid absorbed thereby for disconnecting said liquid distributing means from said wick.

8. In a humidor, a water containing receptacle, a wick arranged therein and projecting therefrom, a contact member arranged to engage said wick, a distributing pad in contact with said contact member, a board associated with said pad and contact member for receiving moisture therefrom for bowing the same and retaining means for preventing longitudinal movement of said board for causing the board to bow when moistened to a predetermined extent for breaking the contact between said contact member and said wick.

9. In a humidor, a water containing receptacle, a wick arranged therein and projecting therefrom, a contact member, a pad associated with said contact member, a rectangular board for supporting said contact member and said pad arranged so that the grain will extend transversely of the board for causing the board when moistened to expand longitudinally and means engaging the end of the board for preventing any longitudinal movement of said ends whereby the center of said board is caused to bow when a predetermined amount of moisture is applied thereto for breaking the contact between said contact member and said wick.

10. In a humidor, a water containing receptacle, a wick arranged therein and projecting therefrom, a moisture distributing member arranged with a contact portion designed to contact with said wick for receiving moisture therefrom by capillary attraction, a board for supporting said moisture distributing member designed to receive moisture therefrom and causing the same to expand, means engaging the end of said board for preventing any longitudinal movement of the ends of said board whereby the board is caused to bow centrally for moving the contact portion of said moisture distributing member out of contact with said wick and means for positively returning said board and said moisture distributing means to their original position when the moisture in said board has been reduced to a predetermined amount.

11. In a humidor, a water receptacle, a wick arranged in said water receptacle and projecting therefrom, a moisture distributing member arranged with a contact point designed to contact with said wick, a strip of wood supporting said moisture distributing member and designed to be bowed centrally for moving the contact portion of said moisture distributing member from contact with said wick, a framework engaging the ends of said strip of wood for preventing the longitudinal movement of said ends when moisture is applied to said wood whereby the wood bows centrally and a spring engaging said framework at one end and pressing against said moisture distributing means at the other end, strain being transmitted through said moisture distributing means to said strip of wood for automatically moving said strip of wood to its original position when the moisture therein has been reduced to a predetermined amount for bringing said contact portion of said moisture distributing member in contact with said wick.

In testimony whereof I affix my signature in presence of two witnesses.

ROLAND A. WILSON.

Witnesses:
 ROBT. T. LANG,
 CLAUDE S. HUDSON.